(12) United States Patent
Rose

(10) Patent No.: US 11,841,809 B1
(45) Date of Patent: Dec. 12, 2023

(54) SYSTEM AND METHOD FOR IN SITU DEBUG

(71) Applicant: Kioxia Corporation, Tokyo (JP)

(72) Inventor: Philip David Rose, Oxfordshire (GB)

(73) Assignee: KIOXIA CORPORATION, Tokyo (JP)

(\*) Notice: Subject to any disclaimer, the term of this patent is extended or adjusted under 35 U.S.C. 154(b) by 0 days.

(21) Appl. No.: 17/481,182

(22) Filed: Sep. 21, 2021

(51) Int. Cl.
| G06F 13/16 | (2006.01) |
| G06F 13/38 | (2006.01) |
| G06F 13/42 | (2006.01) |
| G06F 13/28 | (2006.01) |

(52) U.S. Cl.
CPC ........ G06F 13/1694 (2013.01); G06F 13/287 (2013.01); G06F 13/385 (2013.01); G06F 13/4221 (2013.01)

(58) Field of Classification Search
CPC .................................................... G06F 15/177
See application file for complete search history.

(56) References Cited

U.S. PATENT DOCUMENTS

| 7,392,172 B2 * | 6/2008 | Rostampour ....... G06F 9/45504 718/1 |
| 8,161,336 B1 * | 4/2012 | Azimi ................ G01R 31/3177 714/724 |
| 2006/0245533 A1 * | 11/2006 | Rostampour ......... G06F 13/385 375/377 |

\* cited by examiner

*Primary Examiner* — Henry Tsai
*Assistant Examiner* — Juanito C Borromeo
(74) *Attorney, Agent, or Firm* — Foley & Lardner LLP

(57) ABSTRACT

Memory systems and methods of operating the memory systems are disclose. In one arrangement, a device includes a memory device configured to store first data, a first input/output (I/O) pin, and a serial communication device configured to receive the first data and output the first data. The serial communication device is connected to the first I/O pin via a first device. The device also includes a virtual communication logic configured to receive the first data and output the first data to a communication interface connected to a host device.

20 Claims, 7 Drawing Sheets

SYSTEM AND METHOD FOR IN SITU DEBUG

TECHNICAL FIELD

The present arrangements relate generally to memory devices, and more particularly to debugging memory devices in situ using internal communication logic.

BACKGROUND

As the number and types of computing devices continue to expand, so does the demand for memory used by such devices. Memory includes volatile memory (e.g. RAM) and non-volatile memory (e.g., flash memory or NAND-type flash). A non-volatile memory array includes rows and columns (strings) of cells. A cell may include a transistor and be associated with a single bit. These memory devices can act as storage devices for a variety of applications, such as cloud storage. In some applications, the memory devices are connected to servers that host the memory devices and control the flow of data that gets read from and written into the memory devices. Accordingly, the memory devices need to be reliable and have long lifespans in order to store data for users.

Memory devices undergo testing at various stages of manufacturing prior to final assembly and delivery to users. Despite rigorous testing prior to delivery to customers, the memory devices can still have failures once the memory devices are integrated with the system and have the need to be debugged on site. However, once the memory devices are packaged and shipped, it can be difficult to test the functionality of the memory devices because the memory devices are assembled in customized circuit boards or mounted on server racks in secure server rooms. Furthermore, customers often do not want to have debug ports on their systems or have to install custom drivers on their servers for security purposes. Therefore, there is a need for users to be able to easily and securely check the functionality of memory devices.

SUMMARY

The present arrangements relate to systems and methods for debugging memory devices in situ from a host machine without having to connect an external cable or board to the memory chip including the memory devices According to some arrangements, a device includes a memory device configured to store first data, a first input/output (I/O) pin, and a serial communication device configured to receive the first data and output the first data. The serial communication device is connected to the first I/O pin via first device. The device also includes a virtual communication logic configured to receive the first data and output the first data to a communication interface connected to a host device.

In some arrangements, the serial communication device includes a universal asynchronous receiver transmitter (UART), and the virtual communication logic includes a virtual UART.

In some arrangements, the first device includes a demultiplexer configured to receive the first data and output, based on a control signal, the first data to the first I/O pin or the virtual communication logic.

In some arrangements, the first device includes a demultiplexer configured to receive the first data and output, based on a control signal, the first data to the first I/O pin or the virtual communication logic.

In some arrangements, the serial communication device is configured to receive second data from the virtual communication logic and a second I/O pin.

In some arrangements, a baud rate of the virtual communication logic is set to a baud rate of the serial communication device.

In some arrangements, the communication interface includes a peripheral component interconnect express (PCIe) subsystem.

According to some other arrangements, a system includes a processor and a memory chip connected to the processor via a communications protocol. The memory chip includes a memory device configured to store and output first data, a first I/O pin, and a serial communication device configured to receive the first data from the memory device and output the first data. The serial communication device is connected to the first I/O pin via a first device. The memory device also includes a virtual communication logic configured to receive the first data and output the first data to the processor via a communication interface.

In some arrangements, the first device includes a demultiplexer configured to receive the first data and output, based on a control signal, the first data to the first I/O pin or the virtual communication logic.

In some arrangements, the first device includes a demultiplexer configured to receive the first data and output, based on a control signal, the first data to the first I/O pin or the virtual communication logic.

In some arrangements, the memory chip further includes an AND gate including a first input connected to the virtual communication logic. a second input connected to a second I/O pin, and an output connected to the serial communication device.

In some arrangements, a baud rate of the virtual communication logic is set to a baud rate of the serial communication device.

In some arrangements, the memory device includes a solid state drive (SSD).

In some arrangements, the communication interface includes a PCIe subsystem.

In yet some other arrangements, a method of operating a memory chip includes receiving, by a serial communication device in the memory chip, first data from a memory device in the memory chip. The processor is connected to the memory chip. The method also includes transmitting, by the serial communication device via a demultiplexer, the first data to a virtual communication logic in the memory chip and outputting, by the virtual communication logic, the first data to a communication interface.

In some arrangements, the method further includes receiving, by the demultiplexer, the serial signal, and outputting, by the demultiplexer based on a control signal, the serial signal to the virtual communication logic or a first I/O pin of the memory chip.

In some arrangements, the method further includes receiving, by the demultiplexer, the serial signal; and outputting, by the demultiplexer based on a control signal, the serial signal to the virtual communication logic and a first I/O pin of the memory chip.

In some arrangements, the method further includes connecting an AND gate to the virtual communication logic, a second I/O pin, and the serial communication device. A first input of the AND gate is connected to the virtual communication logic, a second input of the AND gate is connected to the second I/O pin, and an output of the AND gate is connected to the serial communication device.

In some arrangements, the communication interface includes a PCIe subsystem.

In some arrangements, the memory chip includes solid state memory.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other aspects and features of the present arrangements will become apparent to those ordinarily skilled in the art upon review of the following description of specific arrangements in conjunction with the accompanying figures, wherein.

Figure 1:
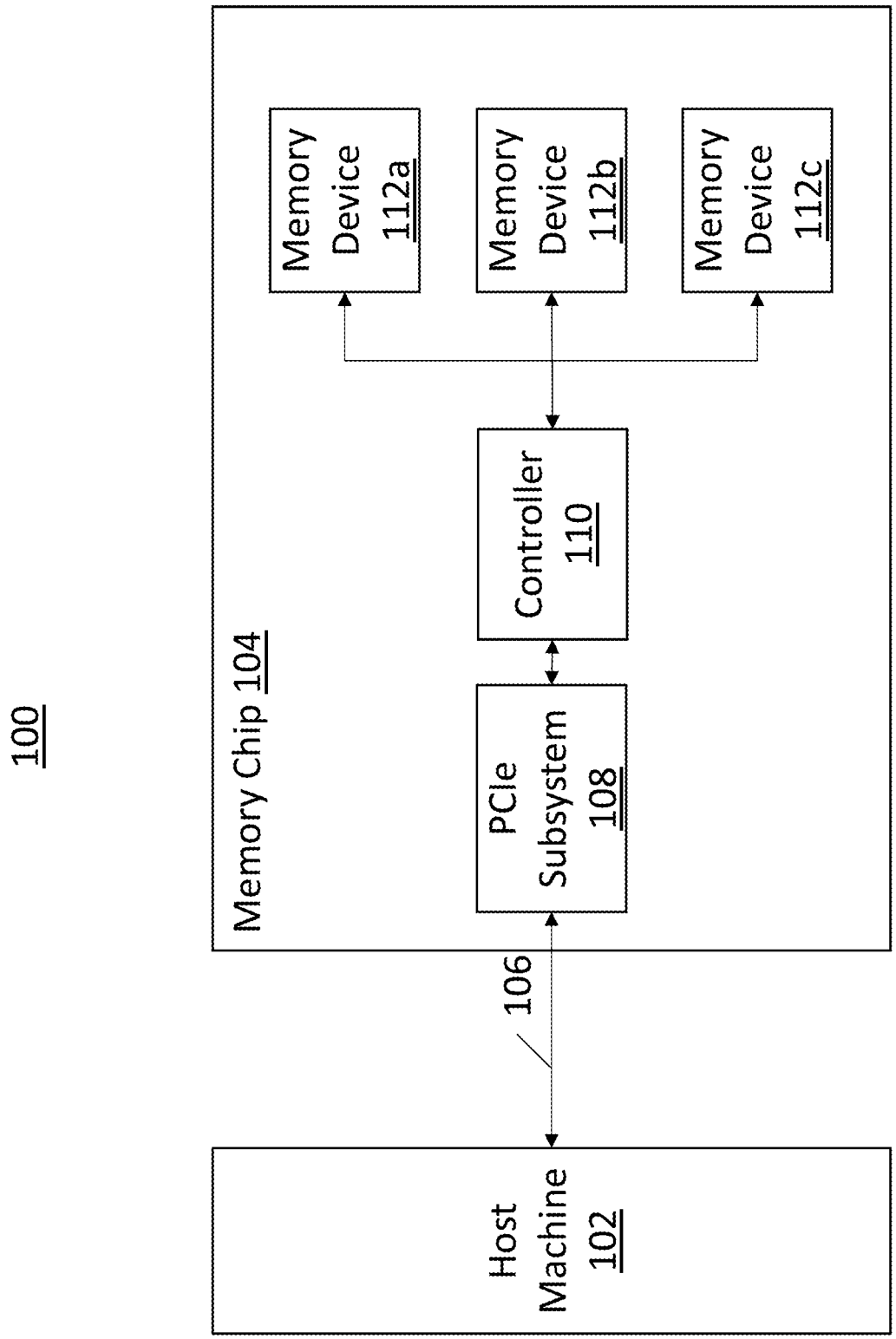
FIG. 1 is a block diagram illustrating an example system including a host machine and a memory chip, in accordance with some arrangements.

Each of FIGS. 4, 5, 6, and 7 is a flow chart illustrating an example method of operating the memory chip of FIG. 1, in accordance with some arrangements.

DETAILED DESCRIPTION

Once a memory card has been inserted into a slot of a server rack or otherwise deployed in a customer system, it may be difficult to debug the memory devices on the memory card. For example, even if the server racks support debug cables or have slots available for debug boards to be attached thereto for debugging purposes, customers may not want to attach cables or attach a debug board once the memory card is mounted in a server. Also, customers may have strict requirements on who is allowed in the server rooms that include sensitive data that may need to be secured from third parties. Furthermore, customers may not want to install custom drivers to the host machines that may be required to debug the memory cards. Additionally, the memory device (e.g., the SSD) may be mounted in some test enclosure of some third-party test equipment or environmental test chamber for controlling humidity and temperature. Access to the memory device is not possible due to the physical design of such test equipment/chamber.

Arrangements of the present disclosure provide systems and methods of debugging a memory device in situ using a standard operating system (OS) based serial port drivers. The host server (or personal computer or machine) that is connected to the memory chip via a communication protocol (e.g., PCIe) is able to test the memory chip without having to install a driver on the host machine. Data that is read out of and written into the memory device(s) can be transferred through a virtual UART that is connected between the PCIe subsystem of the memory chip and the debug UART ports. The present arrangements allows debugging the memory devices without having to connect external debugging devices such as UART cables or debug cards into the server racks.

FIG. 1 is a block diagram illustrating an example system 100 including a host machine 102 (or host) and a memory chip 104, in accordance with some arrangements. The host machine 102 and the memory chip 104 may be connected to one another through a communication link (e.g., a communication bus) 106. The system 100 may include more components that are connected to the host machine 102 and/or the memory chip 104. Further, although FIG. 1 shows each of the host machine 102 and the memory chip 104 as one device, arrangements are not limited thereto, and either or both of the host machine 102 and the memory 104 may include one or more components that are connected together. For example, the host machine 102 may include a plurality of host machines 102 (or processors) connected together, and the memory chip 104 may include a plurality of memory chips 104 connected together.

The host machine 102 may include a standard OS such as an OS based on Linux®, Windows®, UNIX, etc. The host machine 102 may be located in the server room near the memory chip 104 or remotely. The host machine 102 may include a PCIe subsystem that is able to communicate with other components such as the memory chip 104.

The memory devices 112 in the memory chip 104 may include any type of non-volatile memory such as NAND flash memory, dynamic random access memory (DRAM), magnetic random access memory (MRAM), phase change memory (PCM), ferro-electric RAM (FeRAM), and so on. The memory chip 104 may include a PCIe subsystem 108, a controller 110, and one or more semiconductor memory devices 112a, 112b, 112c (collectively memory device(s) 112). The PCIe subsystem 108 can be connected to the host machine 102 through a communication link 106 such as a PCIe link that may use the PCIe protocol, and the host machine 102 and the memory chip 104 can send commands to each other through the PCIe link. The memory chip 104 may also include a controller 110 that may be control the traffic flow in and out of the memory devices 112. The controller 110 can be implemented by a circuit such as a system-on-a-chip (SoC). Although not shown, the memory chip 104 may include one or more other components, such as a random access memory as a volatile memory, such as a dynamic random access memory. Alternatively, a random access memory such as static random access memory (SRAM) may be built in the controller 110. Accordingly, the host machine 102 can control the controller 110 via the PCIe protocol to write data into and read data from the memory devices 112. Although this disclosure refers to the PCIe protocol as the communication protocol between the host machine 102 and the memory chip 104, arrangements are not limited thereto, and one or more other communication protocols can be used such as universal serial bus (USB), PCI, I2C, serial peripheral interface (SPI), Ethernet, etc.

The communication link 106 may include one or more types of communication links. For simplicity, not every connection and intermediate connection device is shown. However, the communication link 106 may include one or more cables, networks, etc. For example, the communication link 106 may include advanced technology attachment (ATA), PCIe, Ethernet, fiber channel, NVM Express (NVMe), or a storage interface that supports multiple functions on the same interface other interfaces.

Figure 2:
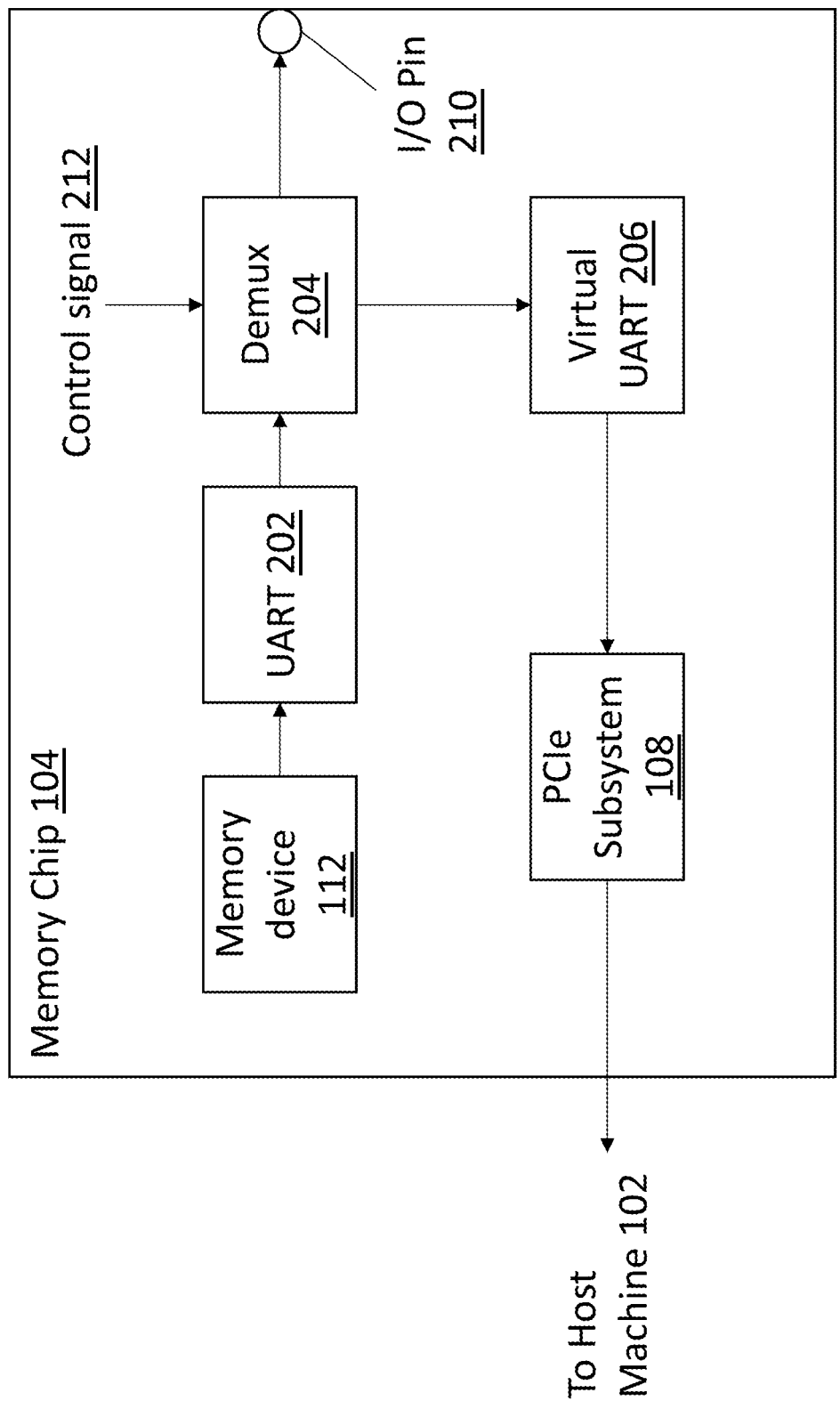
FIG. 2 is a block diagram illustrating an example read data path of the memory chip of FIG. 1, in accordance with some arrangements.

FIG. 2 is a block diagram illustrating an example read data path of the memory chip 104 of FIG. 1, in accordance with some arrangements. The memory chip 104 can include the memory device 112, a UART (or a serial communication device or a device that outputs a serial signal) 202, a demultiplexer (demux) 204, a virtual UART 206, the PCIe subsystem 108, and an I/O pin 210. Although certain components and/or elements are shown in the memory chip 104 of FIG. 2, elements are not limited thereto, and additional components may be implemented within the memory chip 104. Although the components shown in FIG. 2 are shown as separate components, one or more of the components shown in FIG. 2 may be integrated together. For example, the UART 202, the demux 204, and the virtual UART 206 may be disposed within the controller 110 or on a chip separate from but operatively coupled to the controller 110. Furthermore, there may be one or more data and/or command buses (e.g., interconnection buses) that are included between components, e.g., between the PCIe subsystem 108 and the virtual UART 206, between the virtual UART 206 and the demux 204, between the demux 204 and the UART 202, and between the UART 202 and the memory device 112, and between any two components. The interconnection may include one or more interconnect buses such advanced peripheral bus (APB), advanced eXtensible interface (AXI), etc.

The UART 202 can receive as an input a plurality of data signals from memory device 112 or multiple memory devices 112 (not shown) and output the data signals in a serial format to the demux 204. The UART 202 includes a computer hardware device for asynchronous serial communication in which the data format and transmission speeds are configurable. The UART 202 includes a shift register which can convert a parallel signal to a serial signal. For example, during a read operation, the memory devices 112 can output data as a parallel signal, and the UART 202 can convert the parallel signal into a serial signal and output the serial signal. During a write operation, the converse happens. For example, the UART 202 can receive a serial signal, convert the serial signal into a parallel signal using shift registers, and output the signal into a parallel bus. The UART 202 can include an internal clock that is configurable so that the transfer rate (e.g., baud rate) is set by the user. The UART 202 can also include a set of configuration registers that are configurable by the user. For example, the UART 202 can be configured by the host machine 102 via a PCIe link. Although only one UART 202 is shown, arrangements are not limited thereto. For example, there can be a plurality of UARTs 202 within the memory chip 104.

The demux 204 can control where data from the memory device 112 can be transmitted. Inputs to the demux 204 can include a control signal 212 and data (e.g., first data) from the memory device 112. Outputs of the demux 204 can include an I/O pin 210 and the virtual UART 206. The control signal 212 can control whether the demux 204 outputs the data to the virtual UART 206 or the 210. In some arrangements, the control signal 212 can include a plurality of bits and enable the demux 204 to output to both the I/O pin 210 and the virtual UART 206. Accordingly, the UART 202 is not directly connected to the I/O pin 210.

The virtual UART 206 can include software, hardware logic, a UART, or a combination thereof. Furthermore, as described above, the virtual UART 206 can be included in the controller 110 or other component within the memory chip 104. The virtual UART 206 can receive the data from the demux 204 and output the data to the PCIe subsystem 108. The virtual UART 206 can also be configured by configuration registers. Therefore, the virtual UART 206 can have a configurable baud rate that can be set to be equal to or greater than the baud rate of the UART 202. Accordingly, the virtual UART 206 can operate seamlessly with the UART 202.

In order to ensure that the baud rate of the serial signals is compatible (e.g., between the UART 202 and the virtual UART 206), a modification can be made to the baud rate generation of the virtual UART 206. The standard serial port registers to select the baud rate (used by the host machine 102) such as divisor LSB (DLL) and divisor MSB (DLM) can be writeable and readable by the host machine 102. But DLL and DLM registers may be disconnected from the baud rate generation logic block such that the baud rate is not separately generated within the virtual UART 206. Instead, the baud rate of the virtual UART 206 can be locked (set) to the baud rate of the corresponding UART 202. This may ensure that the baud rates of the connected UART 202 and virtual UART 206 are equal without affecting the operation of the standard serial port driver from the host machine 102. That is, although the baud rate set by the host machine 102 may be ignored, the baud rate registers presented to the host machine (e.g., DLF, DLM, and so on) read back the value that the host machine 102 wrote, so the standard host driver is unaffected by the overriding of the baud rate.

In some arrangements, the memory chip 104 can be configured to have an N number of channels between the UART 202 and the virtual UART 206. The virtual UARTs 206 can be configured as follows. For example, there can be N real UARTs (e.g., UART 202) such that each UART 202 is configured to transmit and receive data to a respective virtual UART 206. For example, a virtual UART 206 can include a single port random access memory (RAM) to provide at least N×2 line buffers (e.g., 128 characters each such that there 2 kB of RAM for N=8). During the read operation, a finite state machine (FSM) can be used to transfer data from a receive holding register (RHR) to the RAM for unloading data. And during a write operation, an FSM can be used to transfer data from a transmit holding register (THR) to the RAM. Once data is received, an interrupt (e.g., message signaled interrupt (MSI) or MSI-X write) can be generated. Further, a set of 8-bit I/O registers can be included to model configuration registers of a real UART. Although not described, the virtual UART 206 can be configured with additional settings such that a real UART is modeled within the memory chip 104.

When using the PCIe protocol, the host machine 102 can define a new function (e.g., function 128) for using the virtual UART 206. Accordingly, the host machine 102 can set the virtual UART 206 to respond to a function so that when a user wants to directly read and write to memory devices 112 within the memory chip 104, the host machine 102 can call that particular function number. This allows the user to use standard OS registers and protocols to test the memory data that is being written into and read out of the memory device 112 without having to attach a serial debug cable into the mounted server racks. Furthermore, when configuring the base address register (BAR) for the configuration space of the virtual UART 206, the host machine 102 can program the BAR to be mapped for the virtual UART 206 so that the host machine 102 can access the virtual UART 206 from the host machine 102's system memory.

The I/O pin 210 can receive the output of the demux 204 based on the control signal 212. The I/O pin 210 can function as an I/O pin that can be connected to the rest of system 100 that utilizes the memory chip 104. Further, the I/O pin 210 can be connected to a cable (via wires and/or connectors on the circuit board) so that a user has the option to debug the memory chip 104 or the memory devices 112 using the cable. Although only one I/O pin 210 is shown, arrangements are not limited thereto, and there can be a plurality of I/O pins 210 on the memory chip 104.

Figure 3:
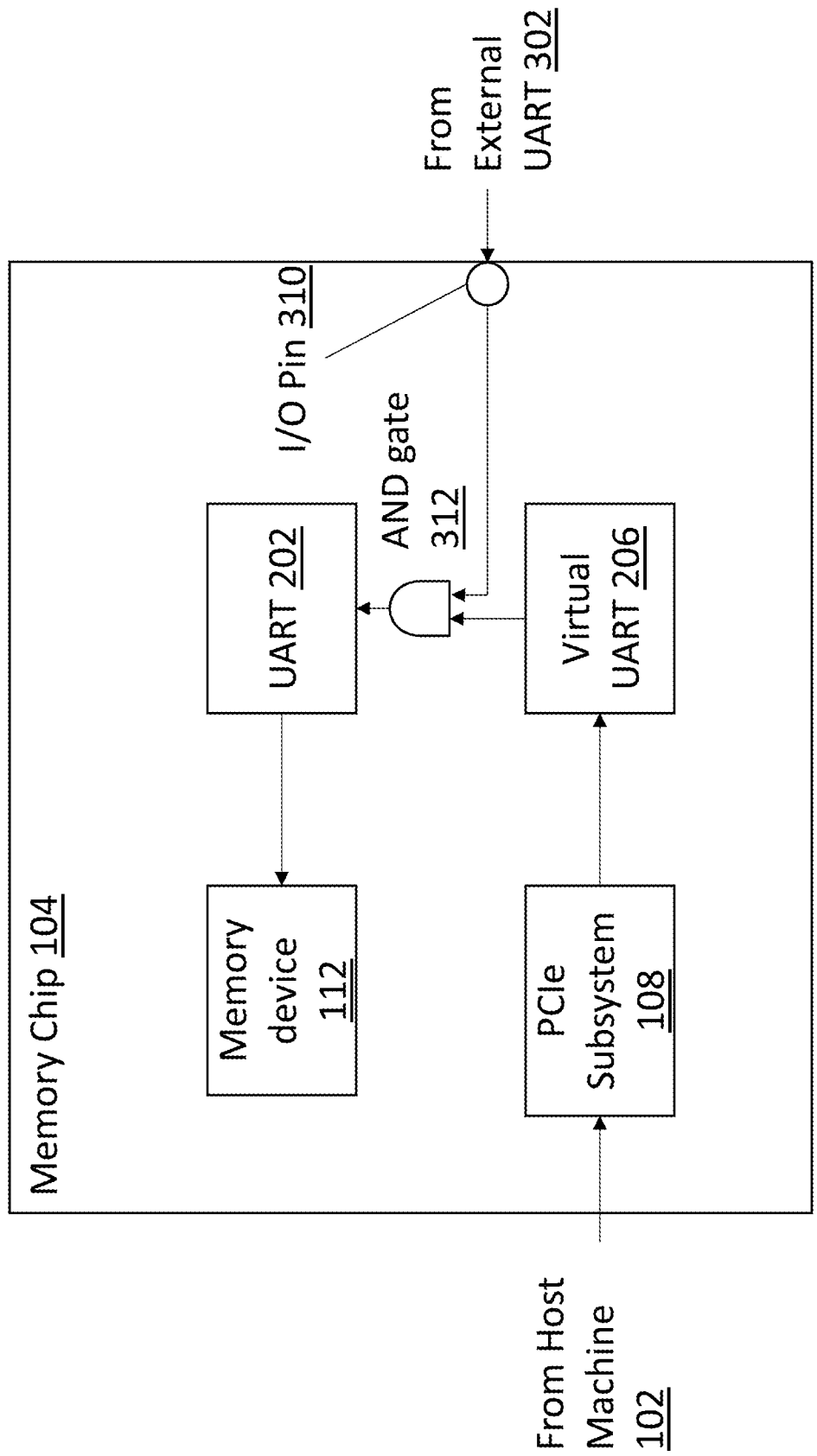
FIG. 3 is a block diagram illustrating an example write data path of the memory chip of FIG. 1, in accordance with some arrangements.

FIG. 3 is a block diagram illustrating an example write data path of the memory chip 104 of FIG. 1, in accordance with some arrangements. FIG. 3 includes the PCIe subsystem 108, the virtual UART 206, an AND gate 312, the UART 202, the memory device 112, and an I/O pin 310.

Although certain components and/or elements are shown in the memory chip 104 of FIG. 3, elements are not limited thereto, and additional components may be implemented within the memory chip 104. Further, although the components shown in FIG. 3 are separately disposed, one or more of the components shown in FIG. 3 may be integrated together. For example, the UART 202, the demux 204, and the virtual UART 206 may be disposed within the controller 110 or on a chip separate from but operatively coupled to the controller 110. Because similar components in FIG. 3 are also shown in FIG. 2 (e.g., PCIe subsystem 108, virtual UART 206, UART 202, and memory device 112), the same descriptions are not repeated.

Data can be written into the memory device 112 in the memory chip 104 by at least two methods: through the host machine 102 or through the I/O pin 310. When the host machine 102 is used, the host machine 102 can call the specific function number (e.g., function 128) to write into the memory device 112 via the PCIe subsystem 108. The virtual UART 206 can receive the data from the PCIe subsystem 108 and output the data to the AND gate 312.

Alternatively, another external device can transmit data to the memory chip 104 via the I/O pin 310. For example, an external UART 302 that is connected to a debug computer can transmit test data through a UART cable (e.g., RS-232 cable) to the circuit board on which the memory chip 104 is disposed and then transfer the data to the I/O pin 310 through one or more connectors and/or wires.

The AND gate 312 can have two or more inputs. A first input can include data from the host machine 102 (via the PCIe subsystem 108 and the virtual UART 206). A second input can include data from the external UART 302 (via the I/O pin 310). An output of the AND gate 312 can include the UART 202. Because UART operates with an active low signal, both the data from the host machine 102 and the data from the external UART 302 can be output to the UART 202. For example, if data is being transmitted from the host machine 102 and not the external UART 302, the AND gate 312 will output a "0" to the UART 202. Similarly, if data is being transmitted from the external UART 302 and not the host machine 102, the output of the NAND gate 312 will output a "0" to the UART 202. Accordingly, data can be received by both the host machine 102 and the external UART 302. Then the external UART 302 can write data into the memory device 112. Accordingly, non-simultaneous access to the memory device 112 can be enabled for both the host machine 102 and the external UART 302. Accordingly, the UART 202 is not directly connected to the I/O pin 310.

Each of FIGS. 4-7 includes flow charts illustrating example process 400-700 of operating the memory chip 104, in accordance with some arrangements. Each of the example processes 400-700 can be performed by a memory chip (e.g., memory chip 104). It is noted that each of the processes 400-700 is merely an example and is not intended to limit the present disclosure. Accordingly, it is understood that additional operations may be provided before, during, and after each of the processes 400-700 of FIGS. 4-7.

Figure 4:
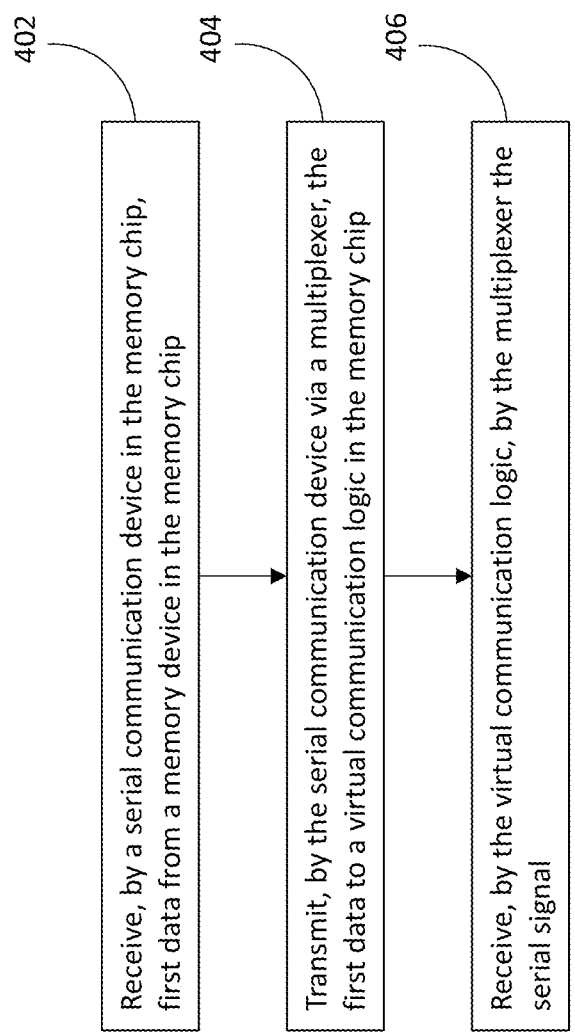

Referring to FIG. 4, the process 400 can start with receiving, by a serial communication device (e.g., UART 202) in the memory chip (e.g., memory chip 104), first data from a memory device (e.g., memory device 112) in the memory chip (402). The processor (e.g., host machine 102) is connected to the memory chip. The process 400 can continue with transmitting, by the serial communication device via a demultiplexer (e.g., demux 204), the first data to a virtual communication logic (e.g., virtual UART 206) in the memory chip (404). The process 400 can continue with outputting, by the virtual communication logic, the first data to a communication interface (e.g., PCIe subsystem 108) (406).

Figure 5:
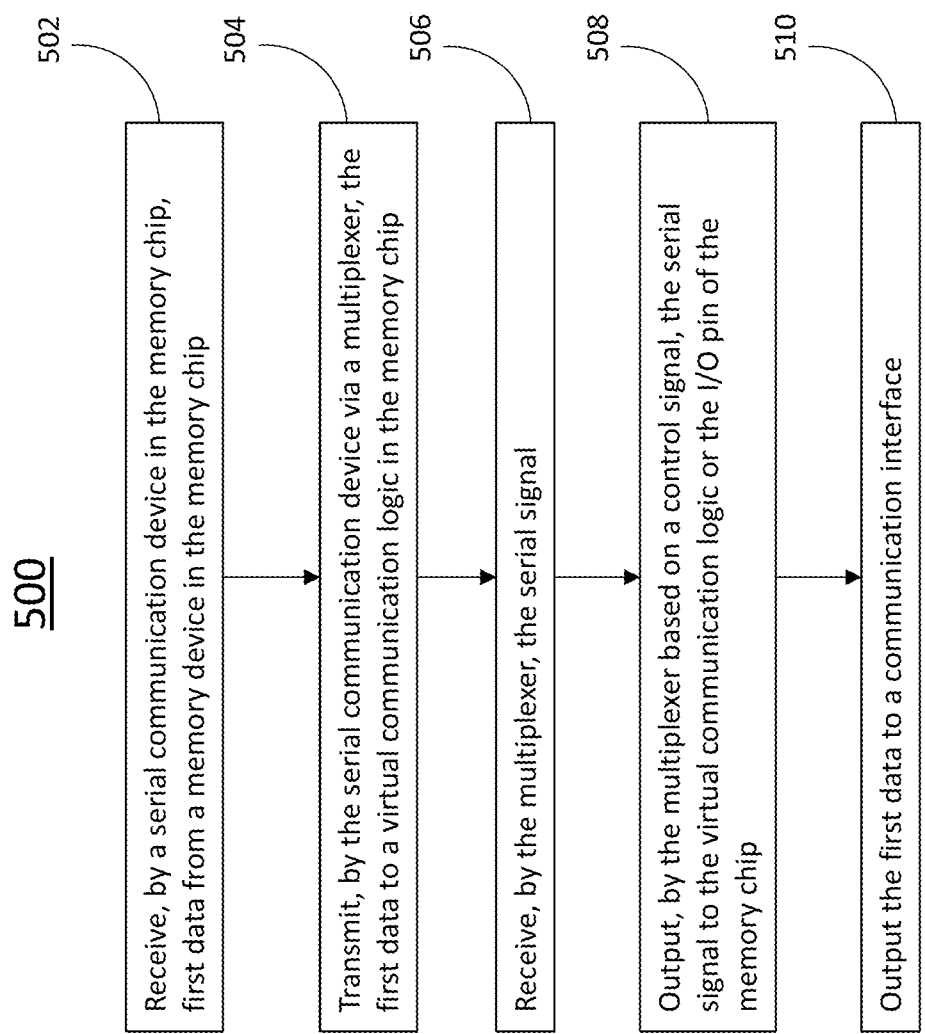

Referring to FIG. 5, the process 500 can start with receiving, by a serial communication device (e.g., UART 202) in the memory chip (e.g., memory chip 104), first data from a memory device (e.g., memory device 112) in the memory chip (502). The processor (e.g., host machine 102) is connected to the memory chip. The process 500 can continue with transmitting, by the serial communication device via a demultiplexer (e.g., demux 204), the first data to a virtual communication logic (e.g., virtual UART 206) in the memory chip (504). The process 500 can continue with receiving, by the multiplexer, the serial signal (506). The process 500 can continue with outputting, by the multiplexer based on a control signal (e.g., control signal 212), the serial signal to the virtual communication logic or a first I/O pin (e.g. I/O pin 210) of the memory chip (508). The process 500 can continue with outputting, by the virtual communication logic, the first data to a communication interface (e.g., PCIe subsystem 108) (510).

Figure 6:
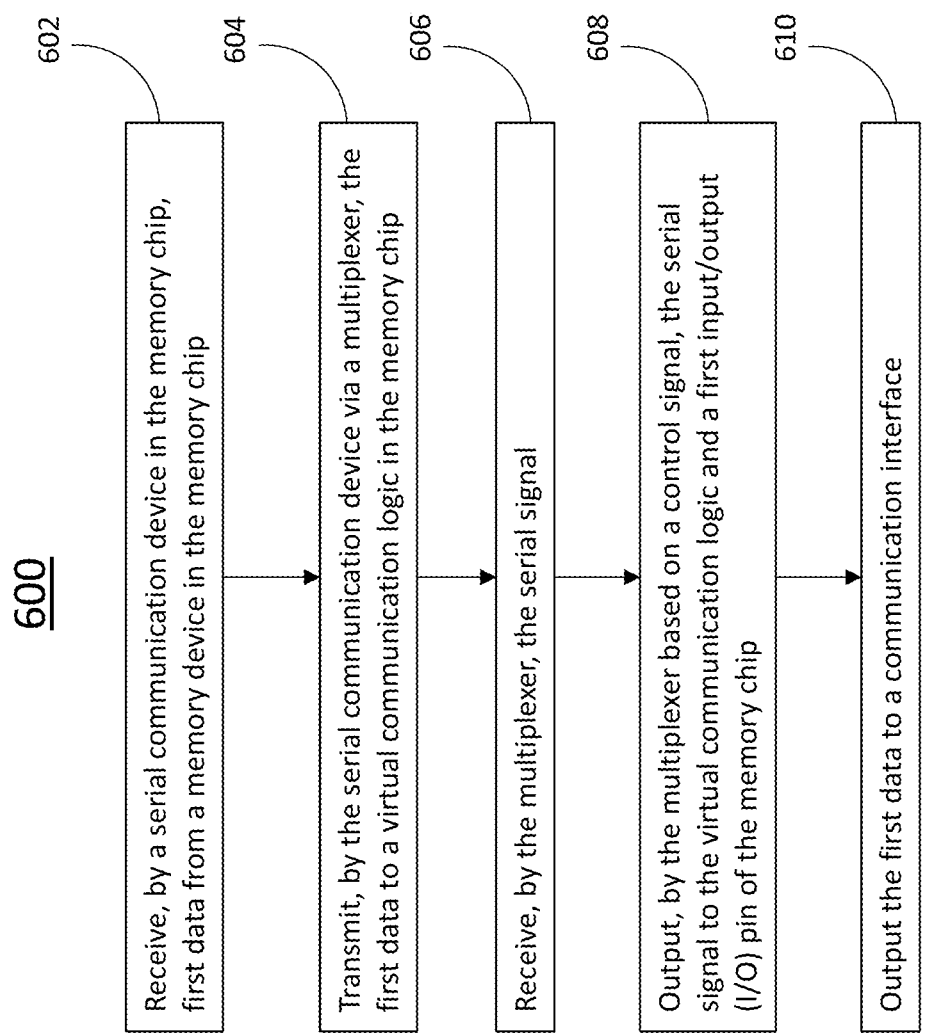

Referring to FIG. 6, the process 600 can start with receiving, by a serial communication device (e.g., UART 202) in the memory chip (e.g., memory chip 104), first data from a memory device (e.g., memory device 112) in the memory chip (602). The processor (e.g., host machine 102) is connected to the memory chip. The process 600 can continue with transmitting, by the serial communication device via a demultiplexer (e.g., demux 204), the first data to a virtual communication logic (e.g., virtual UART 206) in the memory chip (604). The process 600 can continue with receiving, by the multiplexer, the serial signal (606). The process 600 can continue with outputting, by the multiplexer based on a control signal (e.g., control signal 212), the serial signal to the virtual communication logic and a first I/O pin (e.g. I/O pin 210) of the memory chip (608). The process 600 can continue with outputting, by the virtual communication logic, the first data to a communication interface (e.g., PCIe subsystem 108) (610).

Figure 7:
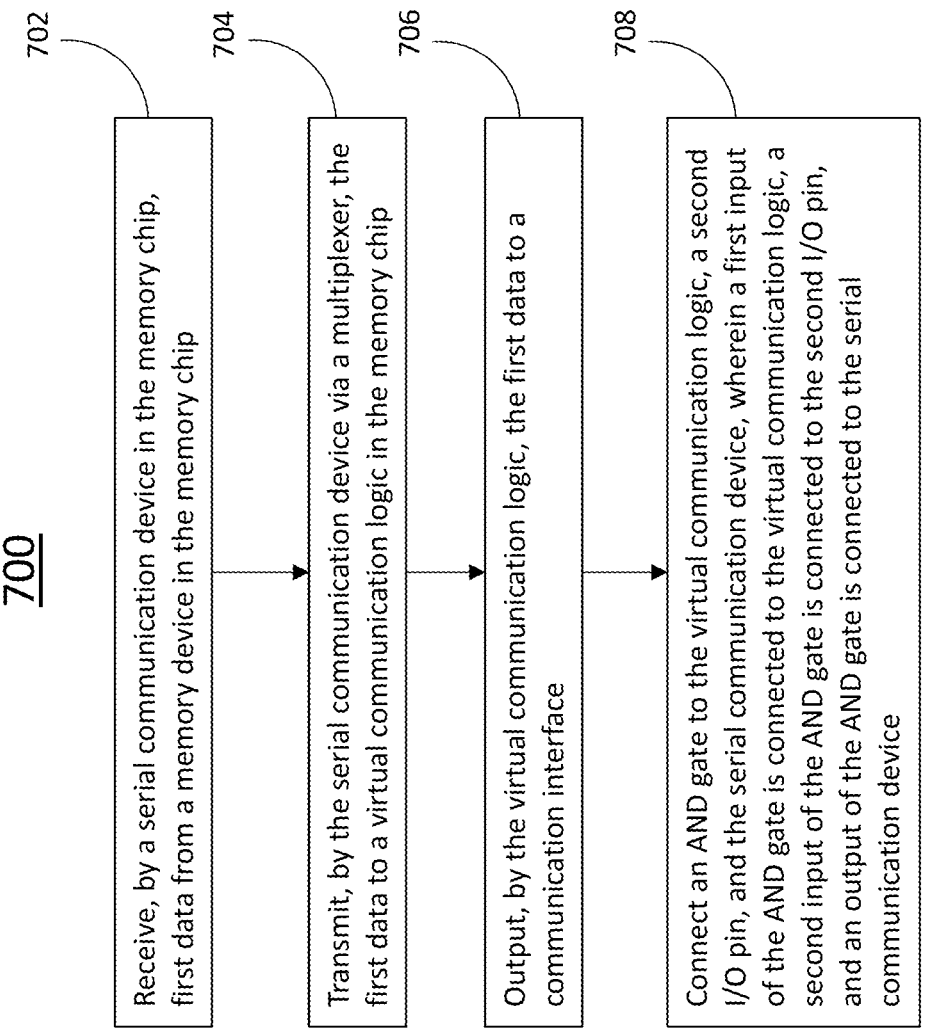

Referring to FIG. 7, the process 700 can start with receiving, by a serial communication device (e.g., UART 202) in the memory chip (e.g., memory chip 104), first data from a memory device (e.g., memory device 112) in the memory chip (702). The processor (e.g., host machine 102) is connected to the memory chip. The process 700 can continue with transmitting, by the serial communication device via a demultiplexer (e.g., demux 204), the first data to a virtual communication logic (e.g., virtual UART 206) in the memory chip (704). The process 700 can continue with outputting, by the virtual communication logic, the first data to a communication interface (e.g., PCIe subsystem 108) (706). The process 700 can continue with connecting an AND gate (e.g., AND gate 312) to the virtual communication logic, a second I/O pin (e.g., I/O pin 310), and the serial communication device. A first input of the AND gate is connected to the virtual communication logic, a second input of the AND gate is connected to the second I/O pin, and an output of the AND gate is connected to the serial communication device (708).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A device, comprising:
a memory device configured to store first data;
a first input/output (I/O) pin;

a serial communication device configured to receive the first data and output the first data to an external device serially via the first I/O pin, wherein the serial communication device is connected to the first I/O pin via a first device; and a virtual communication logic configured to receive the first data from the serial communication device instead of or in addition to the external device by operation of the first device, and to output the first data to a communication interface connected to a host device.

2. The device of claim 1, wherein the serial communication device includes a universal asynchronous receiver transmitter (UART), and wherein the virtual communication logic includes a virtual UART.

3. The semiconductor device of claim 1, wherein the first device includes a demultiplexer configured to receive the first data and output, based on a control signal, the first data to the first I/O pin or the virtual communication logic.

4. The semiconductor device of claim 1, further comprising an AND gate configured to receive the first data from the first I/O pin and the virtual communication logic.

5. The semiconductor device of claim 1, wherein the serial communication device is configured to receive second data from the virtual communication logic and a second I/O pin.

6. The semiconductor device of claim 1, wherein a baud rate of the virtual communication logic is set to a baud rate of the serial communication device.

7. The semiconductor device of claim 1, wherein the communication interface includes a peripheral component interconnect express (PCIe) subsystem.

8. A system, comprising:

a processor; and a memory chip connected to the processor via a communications protocol, wherein the memory chip comprises:

a memory device configured to store and output first data;

a first input/output (I/O) pin;

a serial communication device configured to receive the first data from the memory device and output the first data to an external device serially via the first I/O pin, wherein the serial communication device is connected to the first I/O pin via a first device; and a virtual communication logic configured to receive the first data from the serial communication device instead of or in addition to the external device by operation of the first device, and to output the first data to the processor via a communication interface.

9. The system of claim 8, wherein the first device includes a demultiplexer configured to receive the first data and output, based on a control signal, the first data to the first I/O pin or the virtual communication logic.

10. The system of claim 8, further comprising an AND gate configured to receive the first data from the first I/O pin and the virtual communication logic.

11. The system of claim 8, wherein the memory chip includes an AND gate including:

a first input connected to the virtual communication logic;

a second input connected to a second I/O pin; and an output connected to the serial communication device.

12. The system of claim 8, wherein a baud rate of the virtual communication logic is set to a baud rate of the serial communication device.

13. The system of claim 8, wherein the memory device includes a solid state drive (SSD).

14. The system of claim 8, wherein the communication interface includes a PCIe subsystem.

15. A method of operating a memory chip, the method comprising:

receiving, by a serial communication device in the memory chip, first data from a memory device in the memory chip, wherein the serial communication device is connected to the memory device and is configured to output the first data serially to an external device;

transmitting, by the serial communication device via a demultiplexer, instead of or in addition to the external device, the first data to a virtual communication logic in the memory chip; and outputting, by the virtual communication logic, the first data to a communication interface.

16. The method of claim 15, further comprising:

receiving, by the demultiplexer, the first data; and outputting, by the demultiplexer based on a control signal, the first data to the virtual communication logic or a first input/output (I/O) pin of the memory chip.

17. The method of claim 15, further comprising connecting an AND gate to the virtual communication logic, a second I/O pin, and the serial communication device, wherein a first input of the AND gate is connected to the virtual communication logic, a second input of the AND gate is connected to the second I/O pin, and an output of the AND gate is connected to the serial communication device.

18. The memory of claim 15, wherein the communication interface includes a PCIe subsystem.

19. The method of claim 15, wherein the memory chip includes solid state memory.

20. The device of claim 1, wherein the external device comprises a debugging device.

* * * * *